United States Patent
Murakami et al.

(10) Patent No.: US 12,015,977 B2
(45) Date of Patent: Jun. 18, 2024

(54) CONTROL STATION DEVICE AND WIRELESS TERMINAL STATION DEVICE

(71) Applicant: NIPPON TELEGRAPH AND TELEPHONE CORPORATION, Tokyo (JP)

(72) Inventors: Tomoki Murakami, Musashino (JP); Toshiro Nakahira, Musashino (JP); Ryota Shiina, Musashino (JP); Kazutaka Hara, Musashino (JP); Tomohiro Taniguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 335 days.

(21) Appl. No.: 17/625,435

(22) PCT Filed: Jul. 10, 2019

(86) PCT No.: PCT/JP2019/027358
§ 371 (c)(1),
(2) Date: Jan. 7, 2022

(87) PCT Pub. No.: WO2021/005752
PCT Pub. Date: Jan. 14, 2021

(65) Prior Publication Data
US 2022/0264438 A1   Aug. 18, 2022

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC .............................. H04W 48/18; H04W 48/16
See application file for complete search history.

(56) References Cited

U.S. PATENT DOCUMENTS 7,826,844 B2 *  11/2010  Cooper ................. H04W 48/18
                                                         455/435.2
2013/0073710 A1   3/2013  Lee

FOREIGN PATENT DOCUMENTS

JP    2013537775 A    10/2013
JP    2014110493 A     6/2014
(Continued)

OTHER PUBLICATIONS

Aleksandar Damnjanovic et al., "A survey on 3GPP heterogeneous networks", IEEE Wireless Communications, vol. 18, No. 3, 2011 pp. 10-21.

*Primary Examiner* — Curtis B Odom
(74) *Attorney, Agent, or Firm* — Harness, Dickey & Pierce, P.L.C.

(57) ABSTRACT

A control station device includes a policy generation unit that calculates a priority order of a plurality of wireless communication systems having different types of systems on a basis of information acquired from a wireless terminal device that selects one wireless communication system from among the plurality of wireless communication systems to perform wireless communication, and generates a selection policy indicating the priority order of the plurality of wireless communication systems, and a policy delivery unit that delivers the selection policy indicating the priority order of the plurality of wireless communication systems to the wireless terminal device. With this configuration, an optimal wireless communication system that maximizes the performance of each wireless terminal device can be selected while reducing the load and calculation time imposed on the control station device.

7 Claims, 10 Drawing Sheets

(56) References Cited

FOREIGN PATENT DOCUMENTS

| | | |
|---|---|---|
| JP | 2015146470 A | 8/2015 |
| JP | 2018148297 A | 9/2018 |

\* cited by examiner

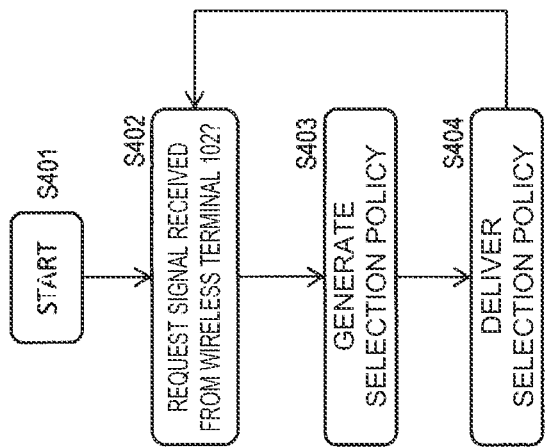

CONTROL STATION DEVICE AND WIRELESS TERMINAL STATION DEVICE

CROSS-REFERENCE TO RELATED APPLICATIONS

This application is a 371 U.S. National Phase of International Application No. PCT/JP2019/027358 filed on Jul. 10, 2019. The entire disclosure of the above application is incorporated herein by reference.

TECHNICAL FIELD

The present invention relates to a control station device and a wireless terminal device in a heterogeneous network in which a plurality of wireless communication systems coexist.

BACKGROUND ART

Wireless traffic continues to increase due to the explosive growth of wireless terminal devices such as smartphones in recent years. To accommodate this wireless traffic, wireless communication systems such as mobile networks and wireless local area networks (LANs) are being installed in various locations, while in addition, the transfer speeds on these wireless communication systems are increasing.

Furthermore, in addition to smartphones, a wide variety of wireless terminal devices such as IoT terminals are also increasing, and wireless communication systems are being deployed to meet the requirements of each. In a heterogeneous network environment where a plurality of such wireless communication systems coexist, research and development related to challenges such as setting the parameters of each wireless communication system and selecting an optimal wireless communication system for a wireless terminal device are actively underway (see Non-Patent Literature 1, for example).

CITATION LIST

Non-Patent Literature

Non-Patent Literature 1: Damnjanovic, Aleksandar, et al. "A survey on 3GPP heterogeneous networks." IEEE Wireless communications 18.3(2011):10-21.

SUMMARY OF THE INVENTION

Technical Problem

In a heterogeneous network, the methods by which a wireless terminal device selects one of a plurality of wireless communication systems to communicate include centralized control, in which a control station device on a network accounts for the entire area provided with services by the plurality of wireless communication systems and specifies the wireless communication system that each wireless terminal device should select, and autonomous distributed control, in which the wireless terminal devices individually select a wireless communication system.

With centralized control, the conditions of the wireless environment in the entire area are ascertainable, and therefore an optimal wireless communication system can be selected. However, there is a problem of increasing burdens being imposed on the control station device side, such as the load related to collecting information about the wireless environment, and the calculation time for selecting the wireless communication system for which maximum performance is obtained.

On the other hand, with autonomous distributed control, the wireless terminal devices themselves select a wireless communication system while ascertaining the conditions of the surrounding environment, and although the load imposed on the control station device side is smaller compared to centralized control, there is a problem in that obtaining maximum performance is difficult.

Furthermore, in cases where the wireless terminal devices move dynamically and in cases where the wireless environment surrounding the wireless terminal devices changes dynamically, there is a possibility that the effects will be limited, and an optimal wireless communication system may not always be selected.

The present invention addresses the problems of centralized control and autonomous distributed control in a heterogeneous network in which a plurality of wireless communication systems coexist, and an object thereof is to provide a control station device and a wireless terminal device capable of selecting an optimal wireless communication system that maximizes the performance of each wireless terminal device, while also reducing the load and calculation time imposed on the control station device.

Means for Solving the Problem

A control station device according to the present invention comprises: a policy generation unit that calculates a priority order of a plurality of wireless communication systems having different types of systems on a basis of information acquired from a wireless terminal device that selects one wireless communication system from among the plurality of wireless communication systems to perform wireless communication, and generates a selection policy indicating the priority order of the plurality of wireless communication systems; and a policy delivery unit that delivers the selection policy indicating the priority order of the plurality of wireless communication systems to the wireless terminal device.

A wireless terminal device according to the present invention comprises: a communication unit that collects information related to wireless communication with a plurality of wireless communication systems, and transmits the collected information to a control station device; a policy request unit that requests, from the control station device, a selection policy indicating a priority order for selecting one wireless communication system with which to perform wireless communication from among the plurality of wireless communication systems; a policy saving unit that saves the selection policy acquired from the control station device; and a system selection unit that selects one wireless communication system with which to perform wireless communication from among the plurality of wireless communication systems on a basis of the selection policy saved by the policy saving unit.

Effects of the Invention

In a heterogeneous network in which a plurality of different wireless communication systems coexist, the control station device placed on the network delivers a selection policy indicating a priority order of the wireless communication systems in each area, and each wireless terminal device selects a wireless communication system in accordance with the priority order in the selection policy, thereby solving the problems of centralized control and autonomous distributed control of the related technology and making it possible for the control station device and the wireless terminal device according to the present invention to select an optimal wireless communication system that maximizes the performance of each wireless terminal device while also reducing the load and calculation time imposed on the control station device.

BRIEF DESCRIPTION OF DRAWINGS

FIG. 10 is a diagram illustrating an example of a procedure for generating and delivering a selection policy when a request signal is received.

DESCRIPTION OF EMBODIMENTS

Hereinafter, an embodiment of a control station device and a wireless terminal device according to the present invention will be described with reference to the drawings. Note that in the following embodiment, the control station device is referred to as the control device, and the wireless terminal device is referred to as the wireless terminal.

Figure 1:
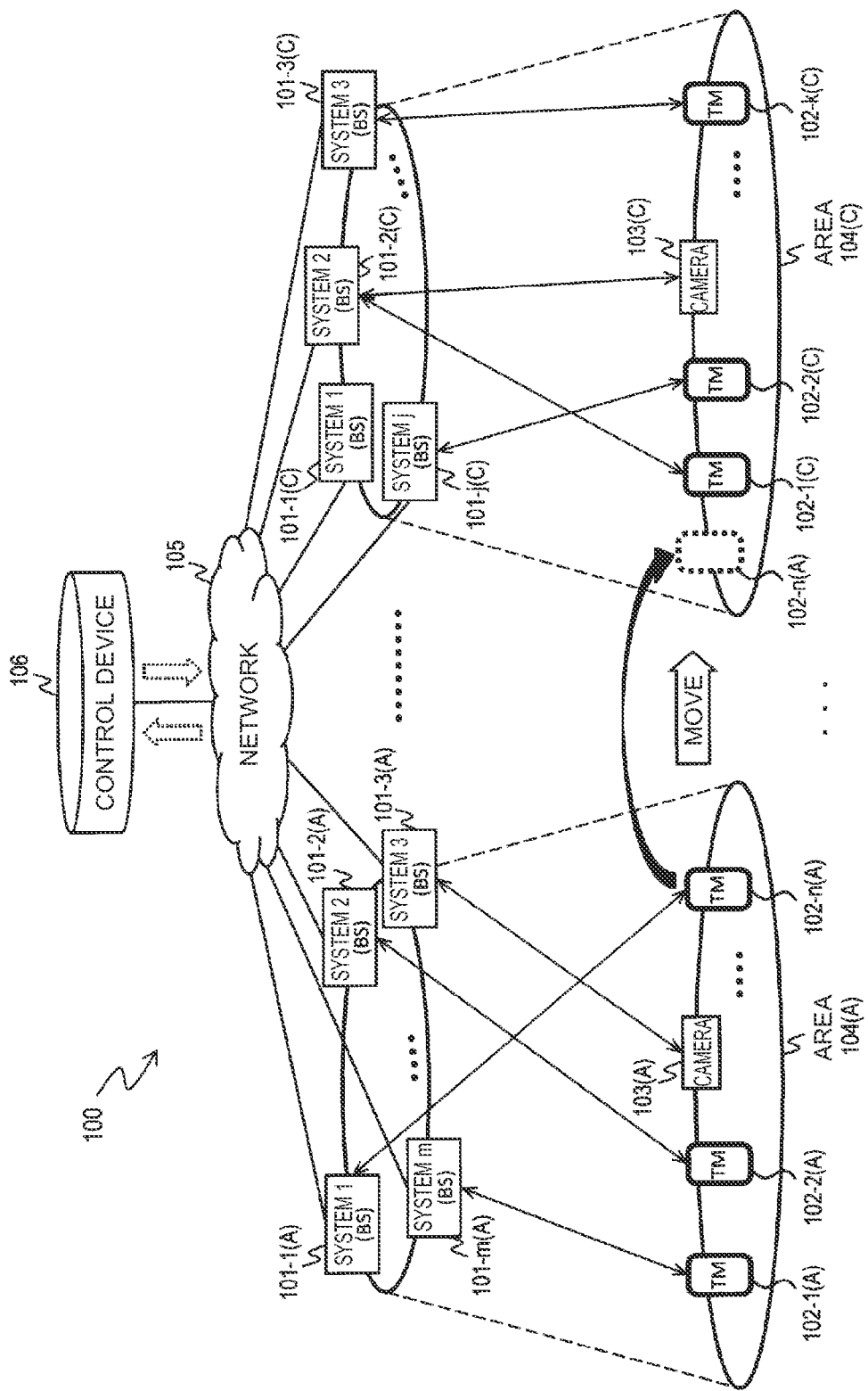
FIG. 1 is a diagram illustrating an example of a heterogeneous network according to an embodiment.

FIG. 1 illustrates an example of a heterogeneous network 100 according to the embodiment. The heterogeneous network 100 illustrated in FIG. 1 has a plurality of areas 104, with a plurality of wireless base stations 101 supporting different wireless communication systems disposed in each of the areas 104, and each wireless base station 101 is connected to a control device 106 over a network 105. Also, inside each area 104, a plurality of wireless terminals 102 are used, and a camera 103 that captures an image for acquiring the surrounding environment inside each area 104 is disposed. Note that each area 104 is not the communication area covered by the wireless base station 101 of a single wireless communication system, but rather is the range where communication is available by one of the plurality of wireless communication systems.

In the example of FIG. 1, the area 104(A) contains m (where m is a positive integer) wireless base stations 101-1(A), 101-2(A), 101-3(A), . . . , 101-$m$(A) that respectively support m different types of wireless communication systems (denoted by System 1, System 2, System 3, . . . , System m in FIG. 1). Note that in FIG. 1, the wireless base stations are denoted by BS, and for example, the block "System 1 (BS)" indicates the wireless base station 101-1 (A).

Additionally, in the area 104(A), n (where n is a positive integer) wireless terminals 102-1(A), 102-2(A), . . . , 102-$n$(A) are used, and a single camera 103(A) is disposed. Note that in FIG. 1, the wireless terminals are denoted by TM. In the example of FIG. 1, the wireless terminal 102-1 (A) is connected to the wireless base station 101-$m$(A) supporting the system m, the wireless terminal 102-2(A) is connected to the wireless base station 101-2(A) supporting the system 2, and the wireless terminal 102-$n$(A) is connected to the wireless base station 101-1(A) supporting the system 1. Also, the camera 103(A) is connected to the wireless base station 101-3(A) supporting the system 3. Note that multiple cameras 103 may also exist. Also, in the case where the wireless terminals 102 are terminals having a camera function, such as smartphones, the camera function of the wireless terminals 102 may be used instead of the camera 103.

Similarly, the area 104(C) contains j (where j is a positive integer) wireless base stations 101-1(C), 101-2(C), 101-3 (C), . . . , 101-$j$(C) that respectively support j different types of wireless communication systems (denoted by System 1, System 2, System 3, . . . , System j in FIG. 1).

Additionally, in the area 104(C), k (where k is a positive integer) wireless terminals 102-1(C), 102-2(C), . . . , 102-$k$(C) are used, and a single camera 103(C) is disposed. In the example of FIG. 1, the wireless terminal 102-1(C) and the camera 103(C) are connected to the wireless base station 101-2(C) supporting the system 2, the wireless terminal 102-2(C) is connected to the wireless base station 101-$j$(C) supporting the system j, and the wireless terminal 102-$k$(C) is connected to the wireless base station 101-3(C) supporting the system 3. Note that in FIG. 1, the area 104(A) and the area 104(C) are illustrated separately without overlapping, but the areas 104 may overlap each other.

Here, a wireless terminal 102 moves in accordance with movement by a user and in a case where a wireless terminal 102 moves into another area 104 for example, the wireless terminal 102 is connected to one of the wireless base stations 101 in the destination area 104. Not that the wireless base station 101 to which the wireless terminal 102 initially connects when entering an area 104 may be the wireless base station 101 supporting any of the wireless communication systems, and the wireless terminal 102 described in the embodiment hereinafter is capable of temporarily connecting to one of the wireless base stations 101, and then selecting the wireless base station 101 with which maximum performance is obtained from among the plurality of wireless communication systems. In the example of FIG. 1, in the case where the wireless terminal 102-$n$(A) connected to the wireless base station 101-1(A) moves from the area 104(A) to the area 104(C), the wireless terminal 102-$n$(A) temporarily connects to one of the wireless base stations 101 among the plurality of wireless communication systems in the area 104(C), and then selects and connects to the wireless base station 101 with which maximum performance is obtained from among the plurality of wireless communication systems in the area 104(C) according to a method described later.

Note that in the following description, when the m wireless base stations 101-1(A) to 101-$m$(A) in the area 104(A) and the j wireless base stations 101-1(C) to 101-$j$(C) in the area 104(C) are being described in common, the suffix "-numeral(letter)" after the reference sign will be omitted to refer to the wireless base station(s) 101. Similarly, when the n wireless terminals 102-1(A) to 102-$n$(A) in the area 104(A) and the wireless terminals 102-1(C) to 102-$k$(C) in the area 104(C) are being described in common, the suffix "-numeral(letter)" after the reference sign will be omitted to refer to the wireless terminal(s) 102. Also, the area 104(A)

and the area 104(C) will be referred to as the area(s) 104 when being described in common. The same applies to the camera 103(A) and the camera 103(C). Note that the "-numeral" suffix of the reference signs for the wireless base stations 101 is a number indicating the type of wireless communication system supported by the wireless base station 101, and the wireless base station 101-1(A) in the area 104(A) and the wireless base station 101-1(C) in the area 104(C) are wireless base stations 101 supporting the same type of system 1. In addition, the (letter) suffix of the reference signs for the wireless base stations 101, the wireless terminals 102, and the cameras 103 indicates the individual areas 104.

In the heterogeneous network 100 according to the embodiment illustrated in FIG. 1, the wireless terminals 102 in each area 104 can select the wireless communication system with which wireless communication can be performed with maximum performance. To achieve the above, the control device 106 creates and provides to the wireless terminals 102 a policy by which each wireless terminal 102 selects an optimal wireless communication system (selection policy), on the basis of factors such as information related to wireless communication obtained from each wireless terminal 102 (the wireless environment) and information obtained from an image captured by the camera 103 (the surrounding environment). Thereafter, each wireless terminal 102 selects an optimal wireless communication system that maximizes performance on the basis of the selection policy provided by the control device 106.

In this way, the heterogeneous network 100 according to the embodiment can address the problems of the related technology while also harnessing the advantages of both the centralized control and the autonomous distributed control described in the related technology.

<Control Device 106>

Figure 2:
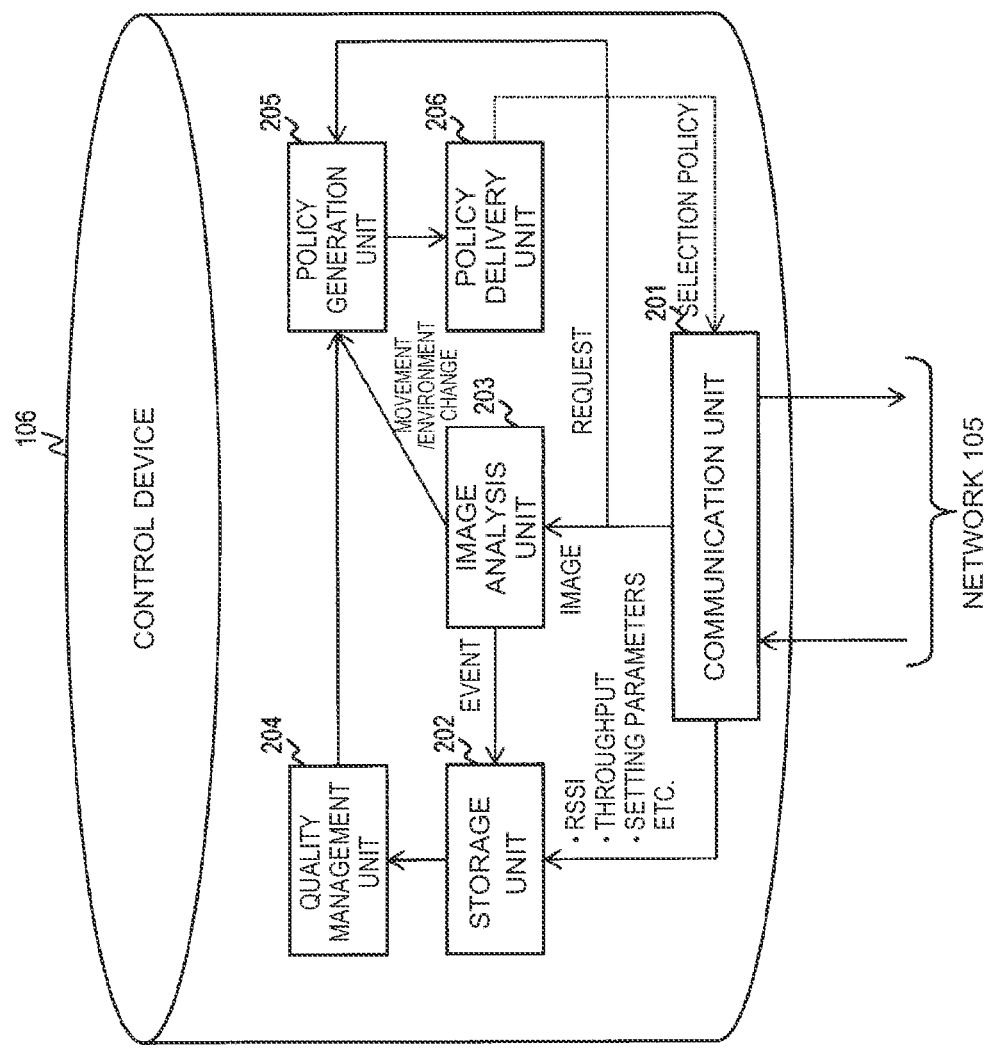
FIG. 2 is a diagram illustrating an example of a control device according to the embodiment.

FIG. 2 illustrates an example of the control device 106 according to the embodiment. In FIG. 2, the control device 106 is connected to the plurality of wireless base stations 101 respectively disposed in the plurality of areas 104 over the network 105. Additionally, the control device 106 communicates various information with the wireless terminals 102 and the cameras 103 in each area 104, calculates a priority order of the wireless communication systems for each area 104 and for each environment, and delivers a selection policy created for each wireless terminal 102 to each wireless terminal 102.

For example, in the embodiment, the control device 106 receives information related to wireless communication, a selection policy request signal, and the like from the wireless terminals 102, and receives image information from the cameras 103. Thereafter, on the basis of the information related to wireless communication, the image information, and the like, the control device 106 creates a selection policy indicating a priority order of the plurality of wireless communication systems by which the wireless terminals 102 select a wireless communication system, and delivers the created selection policy to the wireless terminals 102.

In FIG. 2, the control device 106 includes a communication unit 201, a storage unit 202, an image analysis unit 203, a quality management unit 204, a policy generation unit 205, and a policy delivery unit 206. Note that in FIG. 2, function blocks provided in a typical control device are omitted.

The communication unit 201 receives image information transmitted from the cameras 103 over the network 105, and outputs it to the image analysis unit 203. Additionally, the communication unit 201 receives information related to wireless communication (information such as a received signal strength indicator (RSSI), the throughput, the number of connections, and setting parameters (parameters such as the modulation scheme, the error correction scheme, and the transmission speed)) from each wireless terminal 102 over the network 105, and outputs it to the storage unit 202. Note that the information related to wireless communication may also include information related to packet latency. Also, the communication unit 201 outputs a selection policy request signal received from the wireless terminals 102 over the network 105 to the policy generation unit 205. Furthermore, the communication unit 201 outputs a selection policy output from the policy delivery unit 206 to each wireless terminal 102 over the network 105. Note that the function blocks illustrated in FIG. 2 are assumed to include a function of reciprocally converting signals between blocks such that various types of information can be read.

The storage unit 202 stores information related to wireless communication input from the communication unit 201 and event information input from the image analysis unit 203 in association with each other in a storage medium such as memory. Note that an example of the information stored in the storage unit 202 will be described later. Additionally, for example, because the information related to wireless communication by the wireless terminals 102 changes from moment to moment, a plurality of information is stored in the storage unit 202 in time-series order. Note that statistical information obtained by statistically processing past information may also be stored in the storage unit 202. The information stored in the storage unit 202 is read out by the quality management unit 204. Here, the event information is information such as the presence or absence of people, the number of people, the presence or absence of objects, the number of objects, the types of objects, and the variability of people and objects, for example. Note that the variability is a value expressing the motion of people and objects (such as a change of position, a movement direction, and a movement speed).

The image analysis unit 203 extracts events from images taken by the cameras 103 and received through the communication unit 201, and outputs extracted events to the storage unit 202. Additionally, the image analysis unit 203 distinguishes an environmental change, such as the movement of a person or an object, as a change of event, and when a change of event occurs, the image analysis unit 203 outputs the change of event to the policy generation unit 205 as environmental variation information. Here, a change of event can be distinguished according to whether or not there is a change equal to or greater than a preset threshold compared to an event occurring before or after in the time-series order stored in the storage unit 202, for example. With this configuration, in the case where the number of people inside an area 104 increases for example, the image analysis unit 203 determines that a change of event has occurred, and outputs environmental variation information indicating that the number of people has increased to the policy generation unit 205. Note that events may be determined for each wireless terminal 102 or for each area 104 as a whole.

The quality management unit 204 calculates a priority order of the wireless communication systems to be selected for each event from the information stored in the storage unit 202 with respect to each area 104. The method of calculating the priority order involves computing the average throughput over the entire area 104 for each wireless communication system for each event, and sorting the wireless communication systems in order of highest average throughput, for example. For example, in the case where the average throughput is $P_{th1}$ for the system 1 type of wireless communication system in the area 104(A) with respect to an event 1, the average throughput is $P_{th2}$ for the system 2 type of wireless communication system in the area 104(A) with respect to the event 1, and $P_{th1}<P_{th2}$, the priority order of the wireless communication systems with respect to the event 1 in the area 104(A) is system 2, system 1, . . . , in order of highest average throughput. Note that the priority order may also be calculated on the basis of average latency or minimum throughput. Information about the priority order of the wireless communication systems for each area 104 and for each event computed in this way is output to the policy generation unit 205. Here, in the case where the quality management unit 204 determines events for each area 104 as a whole, the events of all wireless terminals 102 in each area 104 are the same. In this case, the quality management unit 204 may calculate a priority order of the wireless communication systems for each area 104 on the basis of the information related to wireless communication (such as the throughput) for each wireless terminal 102, but may adjust the priority order on the basis of the events in each area 104 as a whole. Note that the method of calculating a priority order by the quality management unit 204 will be described in detail later.

The policy generation unit 205 generates a selection policy for each wireless terminal 102 on the basis of the information input from the quality management unit 204 and the information input from the image analysis unit 203. Also, the policy generation unit 205 updates the selection policy in the case where a notification that a change of event has occurred is received from the image analysis unit 203. Furthermore, the policy generation unit 205 generates a selection policy according to a request signal from the wireless terminals 102 input from the communication unit 201. Additionally, the policy generation unit 205 outputs the generated selection policy to the policy delivery unit 206. Note that when generating a selection policy, the policy generation unit 205 may also resort a portion of the priority order such that the wireless terminals 102 do not all have the same selection policy. As an example, in the case where the selection policies of a plurality of wireless terminals 102 are concentrated on the same selection policy, the policy generation unit 205 may switch the wireless communication systems in the first and second places of the priority order of the selection policy for a wireless terminal 102 having a high throughput with the second place of the priority order. Alternatively, the policy generation unit 205 may also switch the wireless communication systems in the first and second places of the priority order of the selection policy for a wireless terminal 102 having a small difference of throughput between the wireless communication systems in the first and second places of the priority order. By performing such a process, concentration on a specific wireless communication system is avoided.

The policy delivery unit 206 outputs the selection policy output from the policy generation unit 205 to the communication unit 201.

In this way, on the basis of information related to wireless communication received from the wireless terminals 102, image information received from the cameras 103, and the like, the control device 106 according to the embodiment can create a selection policy indicating information such as a priority order of the plurality of wireless communication systems by which the wireless terminals 102 select a wireless communication system to use, and transmit the created selection policy to the wireless terminals 102.

Figure 3:
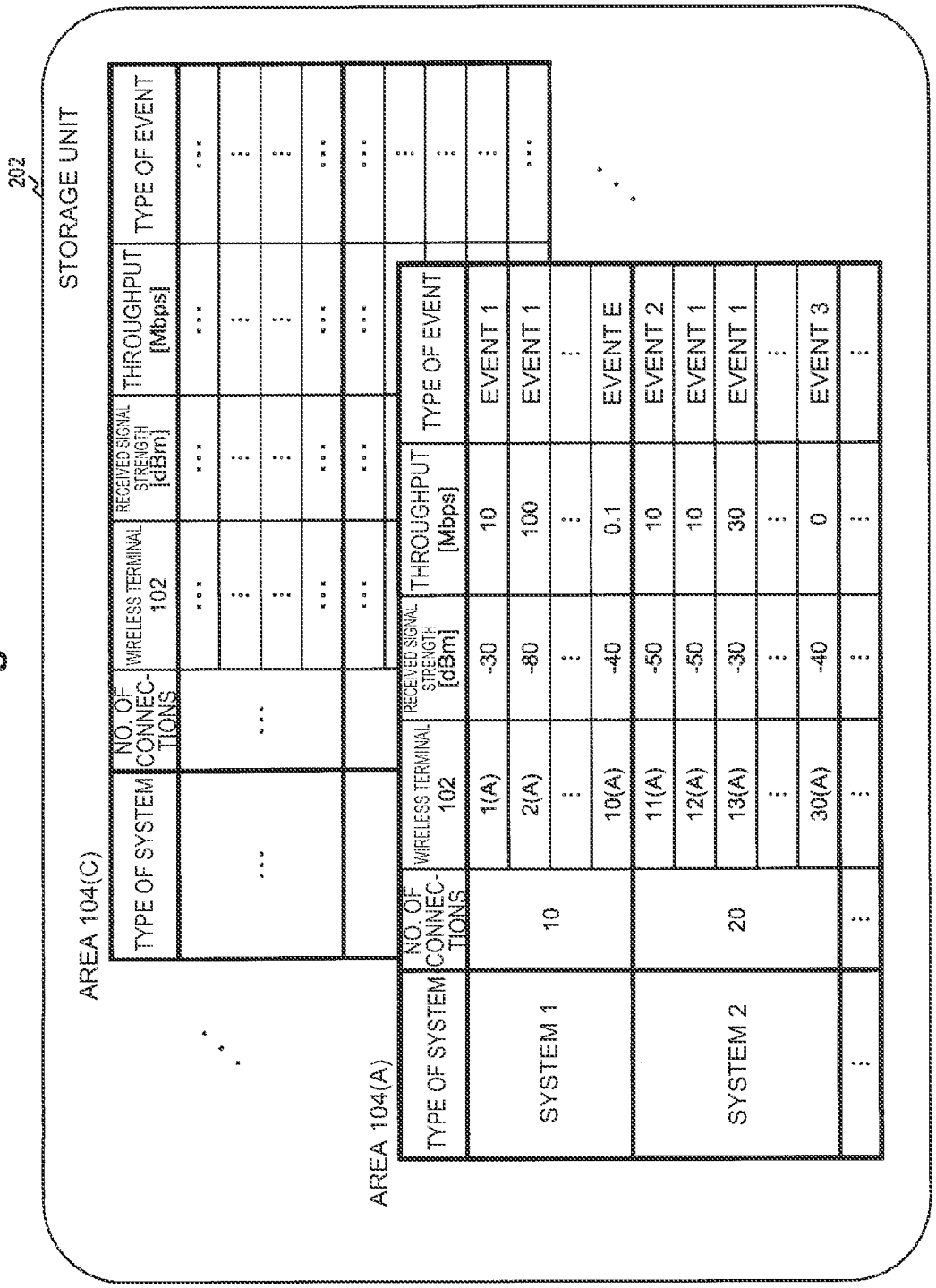
FIG. 3 is a diagram illustrating an example of information stored in a storage unit of the control device.

FIG. 3 illustrates an example of information stored in the storage unit 202 of the control device 106. In the example of FIG. 3, information associating items such as the type of wireless communication system (in FIG. 3, "wireless communication system" is abbreviated to "system"), the number of connections, the wireless terminals, the received signal strength, the throughput, and types of events is stored for each area 104 in the storage unit 202.

In the example of FIG. 3, in the area 104(A), wireless base stations 101 supporting the two types of wireless communication systems denoted system 1 and system 2 exist, in which the number of connections is 10 for the system 1 and 20 for the system 2. Here, the number of connections indicates the number of wireless terminals 102 connected to the corresponding system, and in the example of FIG. 3, the 10 wireless terminals 102-1(A), 102-2(A), . . . , 102-10(A) are connected to the system 1. Also, the 20 wireless terminals 102-11(A), 102-12(A), 102-13(A), . . . , 102-30(A) are connected to the system 2. Additionally, information about the received signal strength and throughput received from each wireless terminal 102 and information about events extracted by the image analysis unit 203 from images captured by the cameras 103 are stored in association with each of the wireless terminals 102 in the storage unit 202.

In FIG. 3 for example, for the wireless terminal 102-1(A) in the system 1, the received signal strength is −30 dBm, the throughput is 10 Mbps, and the type of event is an event 1. Here, as described above, the events such as event 1, event 2, event 3, . . . , event E are information corresponding to properties such as the presence or absence of people, the number of people, the presence or absence of objects, the number of objects, the types of objects, and the variability of people and objects, for example. As an example, the event 1 indicates a state of "many people", the event 2 indicates a state of "few people", the event 3 indicates a state of "high object variability", the event E indicates a state of "few objects", and so on. Note that the types of events for each of the wireless terminals 102 are distinguished by the image analysis unit 203 on the basis of images captured by the cameras 103.

Here, in FIG. 3, events are described as being extracted for each wireless terminal 102, but because each camera 103 captures an image of an entire area 104, events may also be acquired for each area 104 as a whole. In this case, for the area 104(A) for example, types of events such as a state of "many people" and a state of "people moving quickly" are distinguished, and therefore in the example of FIG. 3, the 10 wireless terminals 102 of the system 1 and the 20 wireless terminals 102 of the system 2 existing in the same area 104(A) have the same type of event (for example, the event 1).

Note that in the case of extracting events for each wireless terminal 102, it is possible to acquire events for each wireless terminal 102 by acquiring position information about a wireless terminal 102, and extracting an image of the area around the wireless terminal 102 from the image of the entire area 104 captured by the camera 103, for example. Here, the position information about a wireless terminal 102 is acquirable by the wireless terminal 102 itself through information received from a source such as a global navigation satellite system (GNSS) or a beacon of a wireless base station 101 for example, and the position information can be included in the transmission of the information related to wireless communication transmitted from the wireless terminal 102 to the control device 106. In this case, the image analysis unit 203 of the control device 106 can ascertain the position of the wireless terminal 102 in the image by causing the image of the entire area 104 captured by the camera 103 at a predetermined position to overlap with the position information about the wireless terminal 102, and thereby extract and analyze an image of the area around the wireless terminal 102. With this configuration, the image analysis unit 203 is capable of extracting not only events for the entire area 104, but also events for each wireless terminal 102.

Figure 4:
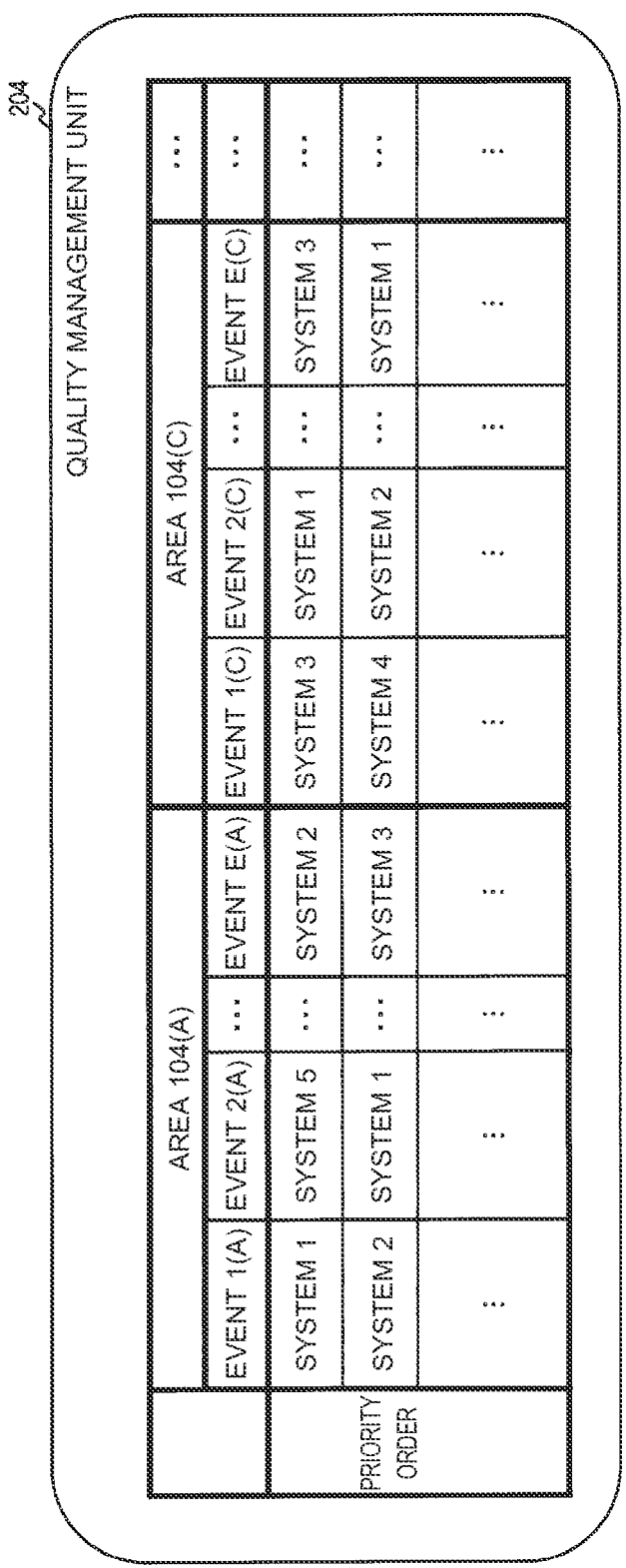
FIG. 4 is a diagram illustrating an example of information in a quality management unit.

FIG. 4 illustrates an example of information in the quality management unit 204. In the example of FIG. 4, information associating items such as the type of wireless communication system (in FIG. 3, "wireless communication system" is abbreviated to "system"), the number of connections, the wireless terminals, the received signal strength, the throughput, and types of events is stored for each area 104.

Here, the suffix (*) of the reference sign for the event 1(A) indicates an identification sign of the area 104, while event*indicates the type of event. For example, the event 1(A) indicates the case of the event 1 in the area 104(A). Similarly, the event 2(A) indicates the event 2 in the area 104(A), and the event E(A) indicates the event E in the area 104(A). Similarly, in the area 104(C), the event 1(C) indicates the case of the event 1 in the area 104(C), the event 2(C) indicates the event 2 in the area 104(C), and the event E(C) indicates the event E in the area 104(C).

Note that regarding the types of events, as described using FIG. 3, the event 1 indicates a state of "many people", the event 2 indicates a state of "few people", and the event E indicates a state of "few objects", for example.

In the example of FIG. 4, a priority order of the wireless communication systems for each of the events (event 1, event 2, . . . , event E) in the area 104(A) is managed.

On the basis of the information stored in the storage unit 202 described using FIG. 3, the quality management unit 204 creates information about a priority order of the wireless communication systems for each area 104 and each type of event as illustrated in FIG. 4.

In FIG. 3 for example, the wireless terminals 102 corresponding to the event 1 in the system 1 for the entire area 104(A) are the two wireless terminals 102-1(A) and 102-2(A), and therefore the average throughput of the wireless terminals 102-1(A) and 102-2(A) is computed. In the example of FIG. 3, the average throughput P-h corresponding to the event 1 in the system 1 in the area 104(A) is (10+100)/2=55 Mbps. Similarly, the wireless terminals 102 corresponding to the event 1 in the system 2 for the area 104(A) are the two wireless terminals 102-12(A) and 102-13(A), and therefore the average throughput of the wireless terminals 102-12(A) and 102-13(A) is computed. In the example of FIG. 3, the average throughput $P_{th2}$ corresponding to the event 1 in the system 2 in the area 104(A) is (10+30)/2=20 Mbps. In this case, in the area 104(A), the average throughput $P_{th1}$ corresponding to the event 1 in the system 1 is higher than the average throughput $P_{th2}$ corresponding to the same event 1 in the system 2, and therefore the priority order for the event 1 in the area 104(A) is system 1, system 2 in order of highest average throughput. With this configuration, the priority order of the event 1(A) in the area 104(A) in the first column of FIG. 4 is computed. Note that in FIG. 4, the event 1(A) indicates the event 1 in the area 104(A). Similarly, the quality management unit 204 is capable of computing a priority order of the wireless communication systems for each type of event in each area 104, as illustrated in FIG. 4.

With this configuration, in each area 104, the quality management unit 204 computes the average throughput (or the average latency, or the minimum throughput) over the entire area 104 of each wireless communication system for each event, and sorts the wireless communication systems in order of highest average throughput (or in order of lowest average latency, or in order of the highest minimum throughput). With this arrangement, the quality management unit 204 is capable of creating and managing information about a priority order for each event in each area 104 as illustrated in FIG. 4.

Additionally, the policy generation unit 205 generates a selection policy on the basis of the information managed by the quality management unit 204 as illustrated in FIG. 4 and the analysis result by the image analysis unit 203. For example, in the case where the analysis result by the image analysis unit 203 with respect to the wireless terminals 102 in the area 104(A) is the event 1(A), in the example of FIG. 4, the priority order of the event 1(A) in the first column of the area 104(A) is generated as a selection policy, and the selection policy is transmitted from the policy delivery unit 206 to the wireless terminals 102. Thereafter, the wireless terminals 102 select the system 1 that is highest in the priority order of the selection policy.

Also, in the case where the policy generation unit 205 receives a selection policy request signal from one of the wireless terminals 102, and the analysis result by the image analysis unit 203 with respect to that wireless terminal 102 changes from the event 1(A) to the event 2(A), the policy generation unit 205 generates the priority order of the event 2(A) in the second column of the area 104(A) in FIG. 4 as a selection policy for example, and the selection policy is transmitted from the policy delivery unit 206 to the wireless terminal 102. Consequently, the wireless terminal 102 can change the connection destination from the system 1 that is highest in the priority order in the case of the event 1(A) to the system 5 that is highest in the priority order in the case of the event 2(A).

With this configuration, the wireless terminals 102 are capable of performing wireless communication by selecting the wireless base station 101 with which maximum performance is obtained from among the plurality of wireless communication systems.

Next, the method of calculating a priority order by the quality management unit 204 will be described in detail. The quality management unit 204 calculates a priority order of the wireless communication systems to be selected on the basis of the information stored in the storage unit 202. As described earlier, at this time, the image analysis unit 203 analyzes the image information from the camera 103 to extract states and variations of people and objects for example as events.

Note that in the above example, the quality management unit 204 computes the average throughput for example (which may also be the average latency or the minimum throughput) in correspondence with each event for each area 104 to calculate a priority order of the wireless communication systems mechanically, but preferred wireless communication systems may also be chosen in advance depending on the type of event as described below. Alternatively, a calculated priority order may also be adjusted to raise the priority of wireless communication systems satisfying the following conditions higher in the priority order.

Event (1) "many people (=wireless terminals)": in this case, it is necessary to increase capacity, and therefore it is preferable to select a "narrowband" wireless communication system.

Event (2) "people (=wireless terminals) moving quickly": in this case, it is necessary to increase capacity and shorten communication times, and therefore it is preferable to select a "narrowband, short-packet" wireless communication system.

Event (3) "poor line of sight (many objects)": in this case, it is preferable to select a "low-frequency" wireless communication system to enable communication even in the shadows of objects and the like.

Event (4) "good line of sight (few objects)": in this case, line-of-sight communication is available, and therefore it is preferable to select a "high-frequency" wireless communication system.

In this way, in the heterogeneous network 100 according to the embodiment, an optimal wireless communication system that maximizes the performance of the wireless terminals 102 can be selected according to the type of event.

Here, as one example of application, the priority orders corresponding to areas 104 and events illustrated in FIG. 4 may also be adjusted depending on the properties and states of the wireless terminals 102. For example, in the case of a wireless terminal 102 experiencing high power consumption, the priority order may be adjusted to raise the priority of a wireless communication system with low power consumption or lower the priority of a wireless communication system with high power consumption. As a similar example, in the case where a wireless terminal 102 is a mobile terminal, the priority order may be adjusted to raise the priority of a wireless communication system that is resilient against fluctuations in communication conditions, whereas in the case where a wireless terminal 102 is a stationary terminal, the priority order may be adjusted to raise the priority of a wireless communication system capable of high-speed communication.

<Wireless Base Station 101>

Figure 5:
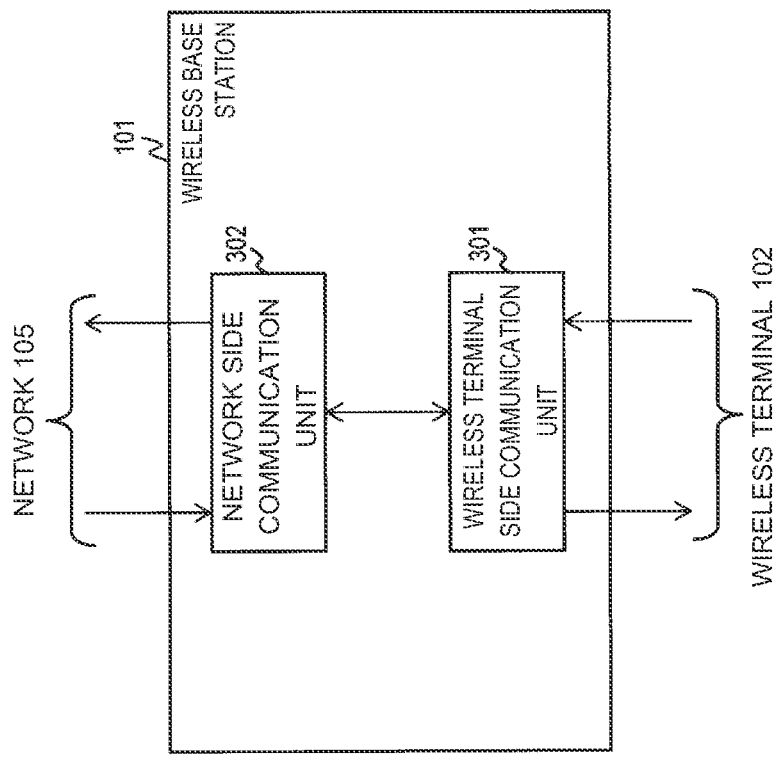
FIG. 5 is a diagram illustrating an example of a wireless base station according to the embodiment.

FIG. 5 illustrates an example of a wireless base station 101 according to the embodiment. In FIG. 5, the wireless base station 101 supports at least one of a plurality of different wireless communication systems, and is capable of wireless communication with the wireless terminals 102. For example, in the area 104(A) in FIG. 1, the wireless base station 101-1(A) is capable of wireless communication with the wireless terminals 102 using the system 1. Similarly, the wireless base station 101-2(A), the wireless base station 101-3(A), and the wireless base station 101-m(A) are capable of wireless communication with the wireless terminals 102 using the system 2, the system 3, and the system m, respectively.

In FIG. 5, the wireless base station 101 includes a wireless terminal side communication unit 301 and a network side communication unit 302. Note that in FIG. 5, function blocks provided in a typical wireless base station are omitted.

The wireless terminal side communication unit 301 is capable of wireless communication with the wireless terminals 102 through a predetermined wireless communication system. For example, in FIG. 1, the wireless base station 101-m(A) is capable of wireless communication with the wireless terminals 102-1(A), 102-2(A), and 102-n(A) through the system m. In the example of FIG. 1, the wireless base station 101-1(A) performs wireless communication with the wireless terminal 102-n(A) through the system 1. Similarly, the wireless base station 101-2(A) performs wireless communication with the wireless terminal 102-2(A) through the system 2, and the wireless base station 101-m(A) performs wireless communication with the wireless terminal 102-1(A) through the system m. Also, the camera 103(A) performs wireless communication with the wireless base station 101-3(A) through the system 3.

The network side communication unit 302 is capable of communicating with the control device 106 over the network 105. In the embodiment, information about a selection policy is received from the control device 106 and transmitted to the wireless terminals 102 through the wireless terminal side communication unit 301, while image information captured by the camera 103 as well as information related to wireless communication and selection policy request signals transmitted by the wireless terminals 102 and input from the wireless terminal side communication unit 301 are transmitted from the network side communication unit 302 to the control device 106.

In this way, the wireless base station 101 is capable of relaying various information communicated between the wireless terminals 102 and the camera 103, and the control device 106.

Here, in the example of FIG. 1, each wireless base station 101 is described as supporting a single wireless communication system among a plurality of different wireless communication systems, but the wireless base station 101-m(A) for example may also support a plurality of different wireless communication systems (for example, the two types of systems denoted system m and system 1). Also, the types of wireless communication systems supportable by the plurality of wireless base stations 101 in the area 104(A) may be different from the types of wireless communication systems supportable by the plurality of wireless base stations 101 in the area 104(C). For example, the system 1 of the wireless base station 101-1(A) in the area 104(A) may be different from the system 1 of the wireless base station 101-1(C) in the area 104(C).

<Wireless Terminal 102>

Figure 6:
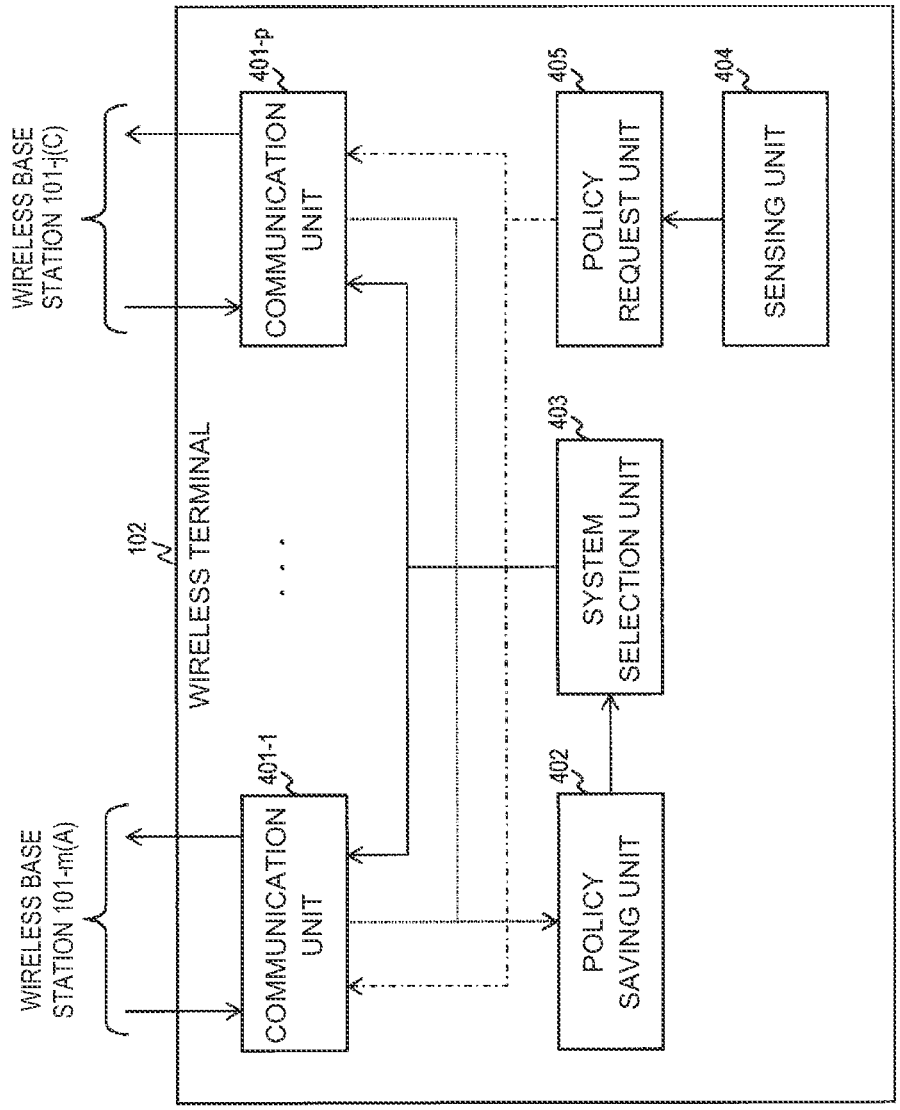
FIG. 6 is a diagram illustrating an example of a wireless terminal according to the embodiment.

FIG. 6 illustrates an example of a wireless terminal 102 according to the embodiment. In FIG. 6, in order to communicate with the wireless base stations 101 of a plurality of different types of wireless communication systems, the wireless terminal 102 includes a plurality of communication units 401 (from a communication unit 401-1 to a communication unit 401-$p$ (where p is a positive integer)) that support each of the wireless communication systems, a policy saving unit 402, a system selection unit 403, a sensing unit 404, and a policy request unit 405. Note that in FIG. 6, function blocks provided in a typical wireless terminal are omitted. Also, the wireless base station 101 that the wireless terminal 102 initially connects to when entering one of the areas 104 may be a wireless base station 101 using any wireless communication method.

Each of the communication units 401 outputs a selection policy received from a connected wireless base station 101 to the policy saving unit 402. Also, the wireless communication functions of each of the communication units 401 are turned on/off by a selection signal output by the system selection unit 403. For example, the wireless communication functions of a communication unit 401 receiving the input of a selection signal from the system selection unit 403 are turned on, and wireless communication with the corresponding wireless base station 101 is enabled. Conversely, the wireless communication functions of a communication unit 401 not receiving a selection signal are turned off, and wireless communication is disabled. Also, in the case where a selection policy request signal is output from the policy request unit 405 to a communication unit 401, the communication unit 401 transmits the request signal to the wireless base station 101. Furthermore, the communication units 401 collect and transmit information related to wireless communication to the control device 106. Here, as described earlier, the information related to wireless communication is basically information such as the received signal strength, the throughput, the number of connections, and setting parameters, for example, but may also include information related to packet latency, and may also include information related to the wireless terminals 102, such as position information about the terminals themselves.

The policy saving unit 402 saves a selection policy received by a connected communication unit 401 to a storage medium such as memory. Additionally, a selection policy saved by the policy saving unit 402 is read out by the system selection unit 403.

The system selection unit 403 selects wireless communication systems in order of highest priority on the basis of a selection policy read out from the policy saving unit 402.

The sensing unit 404 detects whether or not environmental variation has occurred from environmental variation information (such as position information, movement, and variations in the surrounding environment) acquirable by the wireless terminal 102 itself, and in the case of recognizing that environmental variation has occurred, the sensing unit 404 outputs a trigger signal to the policy request unit 405. Here, variations in the surrounding environment may be not only variations related to wireless communication, such as variations in the received signal power when receiving a beacon or the like from a wireless base station 101 for example, but also variations in brightness according to an illuminance sensor in the case where the wireless terminal 102 is a smartphone for example. Alternatively, the wireless terminal 102 itself may be configured to perform image analysis on an image of the surroundings captured in real-time by a smartphone camera and detect variations in people and objects, similarly to the image analysis unit 203 of the control device 106.

In response to the trigger signal output from the sensing unit 404, the policy request unit 405 outputs a new selection policy request signal for updating the selection policy to the communication unit 401. Thereafter, the request signal is transmitted from a communication unit 401 to a wireless base station 101, and received by the control device 106 from the wireless base station 101 over the network 105.

With this configuration, the wireless terminal 102 according to the embodiment is capable of selecting an optimal wireless communication system in order of highest priority order on the basis of a selection policy received from the control device 106 side, and perform wireless communication with the wireless base station 101 of the selected wireless communication system. Also, in the case where environmental variation has occurred, the wireless terminal 102 can request the control device 106 for a new selection policy and thereby re-select an optimal wireless communication system, even in the case where the wireless terminal 102 moves to a different position or the surrounding environment or the like changes.

<Policy Generation Procedure>

Figure 7:
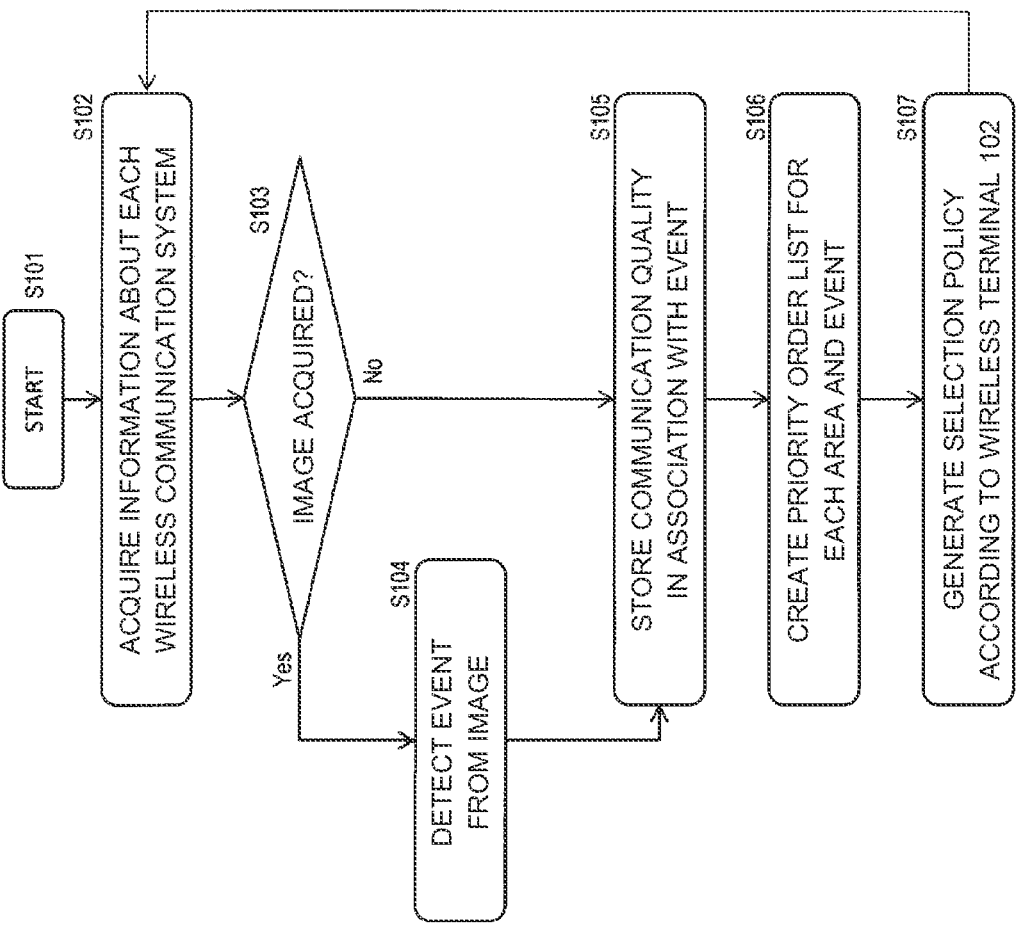
FIG. 7 is a diagram illustrating an example of a policy generation procedure according to the embodiment.

FIG. 7 illustrates an example of a policy generation procedure according to the embodiment. In FIG. 7, the policy generation procedure is executed by the units of the control device 106 described using FIG. 2.

In step S101, the control device 106 starts a selection policy generation process.

In step S102, the control device 106 acquires information about each wireless communication system. For example, information related to wireless communication by the wireless terminals 102 connected to each type of wireless communication system supported by each of the plurality of wireless base stations 101 is acquired. With this arrangement, as described using FIG. 3 for example, the number of wireless terminals 102 connected to the wireless base stations 101 of the "System 1" and "System 2" types of wireless communication systems, information about the received signal strength and throughput of each of the wireless terminals 102, and the like are obtained.

In step S103, the control device 106 determines whether an image captured by the camera 103 has been acquired, and if an image has been acquired, the process proceeds to step S104, whereas if an image has not been acquired, the process proceeds to step S105. Note that the determination of whether or not the camera 103 has captured an image can be made according to whether or not the communication unit 201 receives image information from the camera 103, for example.

In step S104, the image analysis unit 203 detects an event from the image captured by the camera 103. Here, the event is information such as "many people" or "few people", as described using diagrams such as FIG. 3, for example.

In step S105, the storage unit 202 stores the information acquired in step S102 and the information acquired in step S104 in a storage device such as internal memory.

In step S106, the quality management unit 204 creates a priority order list of the types of wireless communication systems with respect to each area 104 and event as described using FIG. 4, on the basis of the information related to wireless communication and the event information for each area 104 stored in the storage unit 202 as described using FIG. 3.

In step S107, the policy generation unit 205 references the analysis result by the image analysis unit 203 and the priority order list created in step S106 to generate a selection policy according to the wireless terminal 102.

With this configuration, the control device 106 is capable of generating a selection policy for each wireless terminal 102. Note that a generated selection policy is transmitted to each wireless terminal 102, and each wireless terminal 102 selects an optimal wireless communication system on the basis of the received selection policy.

<Selection Policy Delivery Procedure (1)>

Figure 8:
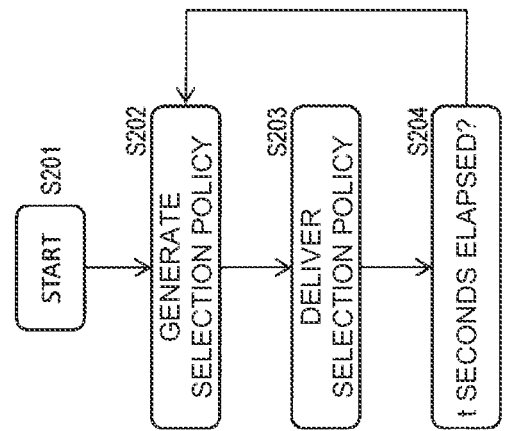
FIG. 8 is a diagram illustrating an example of a procedure for periodically generating and delivering a selection policy.

FIG. 8 illustrates an example of a procedure for periodically generating and delivering a selection policy. In FIG. 8, selection policy generation is executed according to the procedure described using FIG. 7.

In step S201, the control device 106 starts a selection policy generation and delivery process.

In step S202, the control device 106 generates a selection policy for each wireless terminal 102 according to the procedure described using FIG. 7.

In step S203, the policy delivery unit 206 delivers the selection policy generated for each wireless terminal 102 in step S202 to each wireless terminal 102 from the communication unit 201.

In step S204, if a preset time (t seconds) has elapsed since delivering the selection policies, the policy delivery unit 206 returns to the process in step S202, whereas if t seconds have not elapsed, the policy delivery unit 206 stands by until t seconds elapse.

In this way, in the selection policy delivery procedure (1), the control device 106 does not deliver a new selection policy to the wireless terminals 102 until a preset time elapses, thereby decreasing the load imposed by the processes of generating and delivering a selection policy, and also reducing the amount of traffic for the wireless base stations 101 and the communication channel. Also, the frequency at which the wireless terminals 102 switch the types of wireless communication systems is reduced.

<Selection Policy Delivery Procedure (2)>

Figure 9:
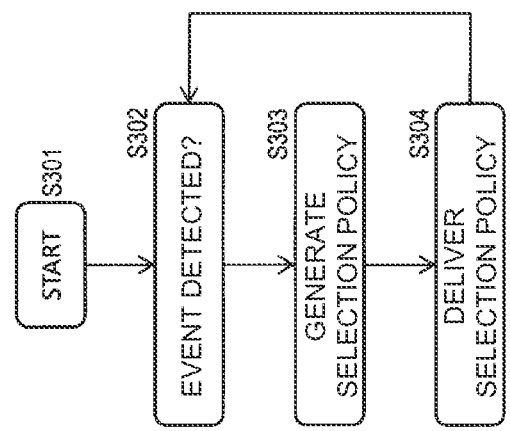
FIG. 9 is a diagram illustrating an example of a procedure for generating and delivering a selection policy when an event is detected.

FIG. 9 illustrates a procedure for generating and delivering a selection policy when an event is detected. In FIG. 9, selection policy generation is executed according to the procedure described using FIG. 7.

In step 3301, the control device 106 starts a process for generating and delivering a selection policy when an event is detected.

In step S302, in the case where the image analysis unit 203 detects an event, the policy generation unit 205 proceeds to the process in step S303, whereas in the case of not detecting an event, the policy generation unit 205 stands by until an event is detected.

In step S303, the control device 106 generates a selection policy for each wireless terminal 102 according to the procedure described using FIG. 7.

In step S304, the policy delivery unit 206 delivers the selection policy generated for each wireless terminal 102 in step S303 to each wireless terminal 102 from the communication unit 201.

In this way, in the selection policy delivery procedure (2), the control device 106 does not deliver a new selection policy to the wireless terminals 102 until an event is detected, thereby decreasing the load imposed by the processes of generating and delivering a selection policy, and also reducing the amount of traffic for the wireless base stations 101 and the communication channel, similarly to the selection policy delivery procedure (1). Also, the frequency at which the wireless terminals 102 switch the types of wireless communication systems is reduced.

<Selection Policy Delivery Procedure (3)>

FIG. 10 illustrates a procedure for generating and delivering a selection policy when a request signal is received. In FIG. 10, selection policy generation is executed according to the procedure described using FIG. 7.

In step S401, the control device 106 starts a process for generating and delivering a selection policy when a request signal is received.

In step S402, in the case where a request signal is received from a wireless terminal 102, the policy generation unit 205 proceeds to the process in step S403, whereas in the case where a request signal is not received, the policy generation unit 205 stands by until a request signal is received.

In step 3403, the control device 106 generates a selection policy for each wireless terminal 102 according to the procedure described using FIG. 7.

In step 3404, the policy delivery unit 206 delivers the selection policy generated for each wireless terminal 102 in step S403 to each wireless terminal 102 from the communication unit 201.

In this way, in the selection policy delivery procedure (3), the control device 106 does not deliver a new selection policy to the wireless terminals 102 until a request signal is received, thereby decreasing the load imposed by the processes of generating and delivering a selection policy, and also reducing the amount of traffic for the wireless base stations 101 and the communication channel, similarly to the selection policy delivery procedure (1). Also, the frequency at which the wireless terminals 102 switch the types of wireless communication systems is reduced.

As described above, in the heterogeneous network 100 in which a plurality of different wireless communication systems coexist, the control device 106 placed on the network 105 delivers a selection policy indicating a priority order of the wireless communication systems in each area 104, and each wireless terminal 102 selects a wireless communication system in accordance with the priority order in the selection policy, thereby solving the problems of centralized control and autonomous distributed control of the related technology and making it possible for the control device 106 and the wireless terminals 102 according to the embodiment to select an optimal wireless communication system that maximizes the performance of each wireless terminal 102 while also reducing the load and calculation time imposed on the control device 106. In other words, in the heterogeneous network 100 according to the embodiment, the control device 106 does not go so far as to specify which wireless communication system each wireless terminal 102 should select, but instead only provides information (a selection policy) indicating a priority order for each area 104, while the wireless terminals 102 are given the freedom to select a wireless communication system.

Particularly, in the embodiment, in order to determine a priority order of the wireless communication systems, the control device 106 analyzes the communication quality in each area 104 on the basis of information related to wireless communication acquired from each wireless terminal 102 and image information acquired by the camera 103 installed in each area 104, and generates a selection policy for each wireless terminal 102 or each area 104 from the analysis result. With this arrangement, the control device 106 is capable of selecting an optimal wireless communication system that maximizes the performance of each wireless terminal 102.

Note that the foregoing embodiment is merely an illustration of the present invention, and obviously the present invention is not limited to the foregoing embodiment. Consequently, components may be added, removed, replaced, or otherwise modified without departing from the technical ideas and the scope of the present invention.

REFERENCE SIGNS LIST 100 heterogeneous network
101 wireless base station
102 wireless terminal
103 camera
104 area
105 network
106 control device
201 communication unit
202 storage unit
203 image analysis unit
204 quality management unit
205 policy generation unit
206 policy delivery unit
301 wireless terminal side communication unit
302 network side communication unit
401 communication unit
402 policy saving unit
403 system selection unit
404 sensing unit
405 policy request unit

The invention claimed is:

1. A control station device comprising:
a processor; and
a non-transitory storage medium having computer program instructions stored thereon, when executed by the processor, perform to:
calculate a priority order of a plurality of wireless communication systems having different types of systems on a basis of information acquired from a wireless terminal device that selects one wireless communication system from among the plurality of wireless communication systems to perform wireless communication, and generate a selection policy indicating the priority order of the plurality of wireless communication systems; and deliver the selection policy indicating the priority order of the plurality of wireless communication systems to the wireless terminal device.

2. The control station device according to claim 1, wherein the computer program instructions further perform to acquire information related to wireless communication from the wireless terminal device, and calculate the priority order for selecting the wireless communication system suited to the wireless terminal device from among the plurality of wireless communication systems on a basis of the information related to wireless communication acquired from the wireless terminal device.

3. The control station device according to claim 2, wherein the computer program instructions further perform to analyze an image acquired from a camera that captures an image inside an area, manage an analysis result and the information related to wireless communication acquired from the wireless terminal device, and generate a selection policy indicating a priority order for the wireless terminal device to select one wireless communication system with which to perform wireless communication from among the plurality of wireless communication systems on a basis of the analysis result and the information related to wireless communication.

4. The control station device according to claim 3, wherein the computer program instructions further perform to extract events indicating a surrounding environment on a basis of the analysis result, and generate the priority order of the plurality of wireless communication systems inside the area for each event, and deliver information about the priority order to the wireless terminal device.

5. The control station device according to claim 2, wherein the priority order is generated on a basis of at least one of an average throughput, an average latency, or a minimum throughput.

6. A wireless terminal device comprising:

a processor; and a non-transitory storage medium having computer program instructions stored thereon, when executed by the processor, perform to:

collect information related to wireless communication with a plurality of wireless communication systems, and transmits the collected information to a control station device;

request, from the control station device, a selection policy indicating a priority order for selecting one wireless communication system with which to perform wireless communication from among the plurality of wireless communication systems;

save the selection policy acquired from the control station device; and select one wireless communication system with which to perform wireless communication from among the plurality of wireless communication systems on a basis of the selection policy.

7. The wireless terminal device according to claim 6, further comprising a sensing unit that acquires information related to a position, a movement, and a surrounding environment of the wireless terminal device, and outputs a trigger signal to the policy request unit in a case where the information changes, wherein the computer program instructions further perform to transmit a request signal requesting the selection policy from the control station device in a case where the trigger signal is input from the sensing unit.

* * * * *